United States Patent
Kobayashi et al.

(10) Patent No.: US 9,842,086 B2
(45) Date of Patent: Dec. 12, 2017

(54) CALCULATION DEVICE, CALCULATION METHOD, AND PROGRAM

(71) Applicant: NIPPON TELEGRAPH AND TELEPHONE CORPORATION, Chiyoda-ku (JP)

(72) Inventors: Tetsutaro Kobayashi, Musashino (JP); Go Yamamoto, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 69 days.

(21) Appl. No.: 14/904,367

(22) PCT Filed: Jun. 30, 2014

(86) PCT No.: PCT/JP2014/067310
§ 371 (c)(1),
(2) Date: Jan. 11, 2016

(87) PCT Pub. No.: WO2015/008605
PCT Pub. Date: Jan. 22, 2015

(65) Prior Publication Data
US 2016/0170937 A1   Jun. 16, 2016

(30) Foreign Application Priority Data

Jul. 18, 2013 (JP) ................. 2013-149155

(51) Int. Cl.
*G06F 17/11* (2006.01)
*G06F 17/18* (2006.01)
(Continued)

(52) U.S. Cl.
CPC .............. *G06F 17/11* (2013.01); *G06F 17/18* (2013.01); *H04L 9/00* (2013.01); *H04L 9/0869* (2013.01);
(Continued)

(58) Field of Classification Search
CPC ....... H04L 9/00; H04L 9/0844; H04L 9/0858; H04L 9/0869; H04L 9/36; H04L 2209/34; G06F 17/18
(Continued)

(56) References Cited

U.S. PATENT DOCUMENTS

| 2012/0323981 A1 | 12/2012 | Yamamoto et al. |
| 2013/0318360 A1 | 11/2013 | Yamamoto et al. |
| 2015/0358162 A1 | 12/2015 | Kobayashi et al. |

FOREIGN PATENT DOCUMENTS

| GB | 2 525 341 A1 | 11/2012 |
| GB | 2 947 813 A1 | 11/2015 |

(Continued)

OTHER PUBLICATIONS

Notice of Reasons for Refusal dated Sep. 27, 2016 in Japanese Patent Application No. 2015-527238 (with English language translation).

(Continued)

*Primary Examiner* — Matthew Sandifer
(74) *Attorney, Agent, or Firm* — Oblon, McClelland, Maier & Neustadt, L.L.P.

(57) ABSTRACT

A first calculation unit is capable of calculating $f(x)^b x_1$ and sets a calculation result of $f(x)^b x_1$ to u, and a second calculation unit is capable of calculating $f(x)^a x_2$, and sets a calculation result of $f(x)^a x_2$ to v. A final calculation unit outputs $(u^{b'} v^{a'})^{1/d}$ for $d = a'a + b'b$ when the calculation result u and the calculation result v satisfy $u^a = v^b$. Here, G and H are groups, f is a function for mapping an element x of the group H to the group G, $X_1$ and $X_2$ are random variables values of which are in the group G, a realization of the random variable $X_1$ is $x_1$, a realization of the random variable $X_2$ is $x_2$, and a, b, a', and b' are integers.

5 Claims, 7 Drawing Sheets (51) Int. Cl.
   *H04L 9/30*   (2006.01)
   *H04L 9/08*   (2006.01)
   *H04L 9/00*   (2006.01)
   *G09C 1/00*   (2006.01)

(52) U.S. Cl.
   CPC .............. *H04L 9/3073* (2013.01); *G09C 1/00* (2013.01); *H04L 2209/24* (2013.01)

(58) Field of Classification Search
   USPC ........................................................ 708/530
   See application file for complete search history.

(56) References Cited

FOREIGN PATENT DOCUMENTS

| JP | 2012-220814 A | 11/2012 |
| JP | 2012-220834 A | 11/2012 |
| WO | 2011/086992 A1 | 7/2011 |
| WO | 2012/057134 A1 | 5/2012 |

OTHER PUBLICATIONS

Extended European Search Report dated Jan. 23, 2017 in patent application No. 14826908.7.
International Search Report dated Aug. 19, 2014 in PCT/JP14/067310 Filed Jun. 30, 2014.

CALCULATION DEVICE, CALCULATION METHOD, AND PROGRAM

TECHNICAL FIELD

The present invention relates to a cryptographic technique, particularly to a self-correcting technique.

BACKGROUND ART

A self-correcting technique is one of cryptographic techniques (refer to Patent Literature 1 and Patent Literature 2, for example). The self-correcting technique is a technique for performing correct calculation at all time by using a calculator or a system which does not always output a correct calculation result (when a calculator which outputs a correct calculation result is used, a correct calculation result is outputted, and when a calculator which does not always output a correct result is used, a correct calculation result is obtained or a result representing that the calculation is impossible is obtained). For example, in a cloud-key management type decryption technique employing the self-correcting technique, a decryption capability provision device which holds a decryption key provides a decryption device only with information, by which the decryption device decrypts a cipher text, without providing the decryption device with the decryption key. The decryption device can always perform correct decryption calculation with this information.

PRIOR ART LITERATURE

Patent Literature

Patent literature 1: International Publication No. WO/2011/086992
Patent literature 2: International Publication No. WO/2012/057134

SUMMARY OF THE. INVENTION

Problems to be Solved by the Invention

However, in the self-correcting technique described on Patent Literature 1 and Patent Literature 2, two natural numbers a and b which are coprime are used and $u^{b'}v^{a'}$ for integers a' and b' which satisfy the relation of a'a+b'b=1 is obtained. When a and b is not coprime or a' and b' do not satisfy the relation of a'a+b'b=1, this self-correcting technique is not available.

In view of such problem, an object of the present invention is to provide a self-correcting technique exhibiting high flexibility in setting.

Means to Solve the Problems

In the present invention, $f(x)^b x_1$ is calculable, a calculation result of $f(x)^b x_1$ is denoted as u, $f(x)^a x_2$ is calculable, a calculation result of $f(x)^a x_2$ is denoted as v, and $(u^{b'} v^{a'})^{1/d}$ for d=a'a+b'b is outputted in a case where the calculation results u and v satisfy $u^a = v^b$.

Effects of the Invention

The self-correcting technique of the present invention is available in such cases where a and b is not coprime and a' and b' do not satisfy the relation of a'a+b'b=1 because $(u^{b'} v^{a'})^{1/d}$ for d=a'a+b'b is obtained. Thus, the self-correcting technique of the present invention exhibits high flexibility in setting.

DETAILED DESCRIPTION OF THE EMBODIMENTS

Figure 1:
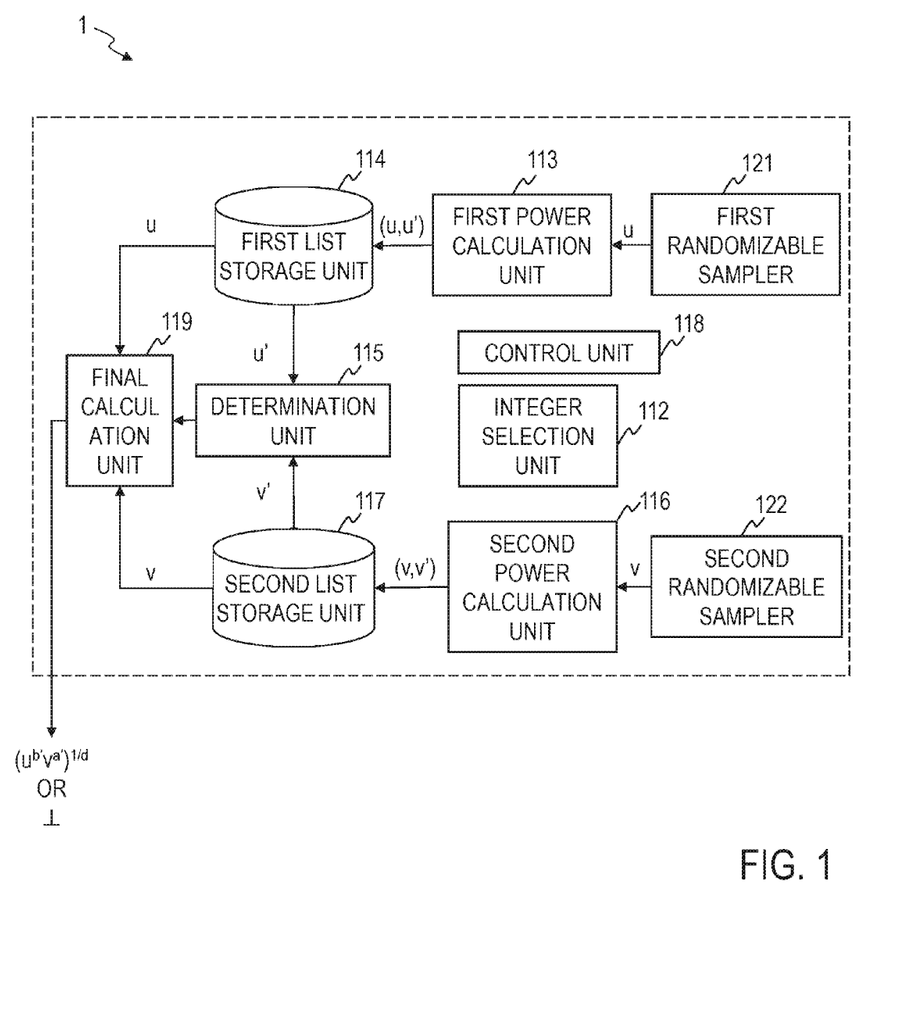
FIG. 1 is a block diagram illustrating the configuration of a calculation device which executes a self-correcting technique of a first embodiment.

Embodiments of the present invention will be described below with reference to the accompanying drawings.
[First Embodiment]
<Configuration>
As illustrated in FIG. 1, a calculation device 1 according to a first embodiment includes an integer selection unit 112, a first power calculation unit 113, a first list storage unit 114, a determination unit 115, a second power calculation unit 116, a second list storage unit 117, a control unit 118, a final calculation unit 119, a first randomizable sampler 121, and a second randomizable sampler 122. In the first embodiment, the first randomizable sampler 121 and the second randomizable sampler 122 correspond to a "first calculation unit" and a "second calculation unit" respectively. It is assumed that G and H are groups (for example, finite commutative groups such as a cyclic group), function $f: H \to G$ is a function for mapping an element x of the group H to the group G, generators of the groups G and H are $\mu_g$ and $\mu_h$ respectively, $X_1$ and $X_2$ are random variables values of which are in the group G, a realization of the random variable $X_1$ is $x_1$, and a realization of the random variable $X_2$ is $x_x$. The calculation device 1 is a device which is configured when a general-purpose or special-purpose computer, which is provided with a processor (hardware processor) such as a central processing unit (CPU), a memory such as a random-access memory (RAM) and a read-only memory (ROM), and the like, executes a predetermined program, for example. The computer may include a single piece of processor and a single piece of memory or include a plurality of processors and a plurality of memories.

This program may be installed on the computer or may be recorded in a ROM or the like in advance. Further, a part or all processing units may be constituted by using an electronic circuit which independently realizes the processing configuration instead of an electronic circuit (circuitry), which realizes the functional configuration when a program is read in, such as a CPU. Furthermore, an electronic circuit constituting a single piece of device may include a plurality of CPUs.

<Processing>

Figure 2:
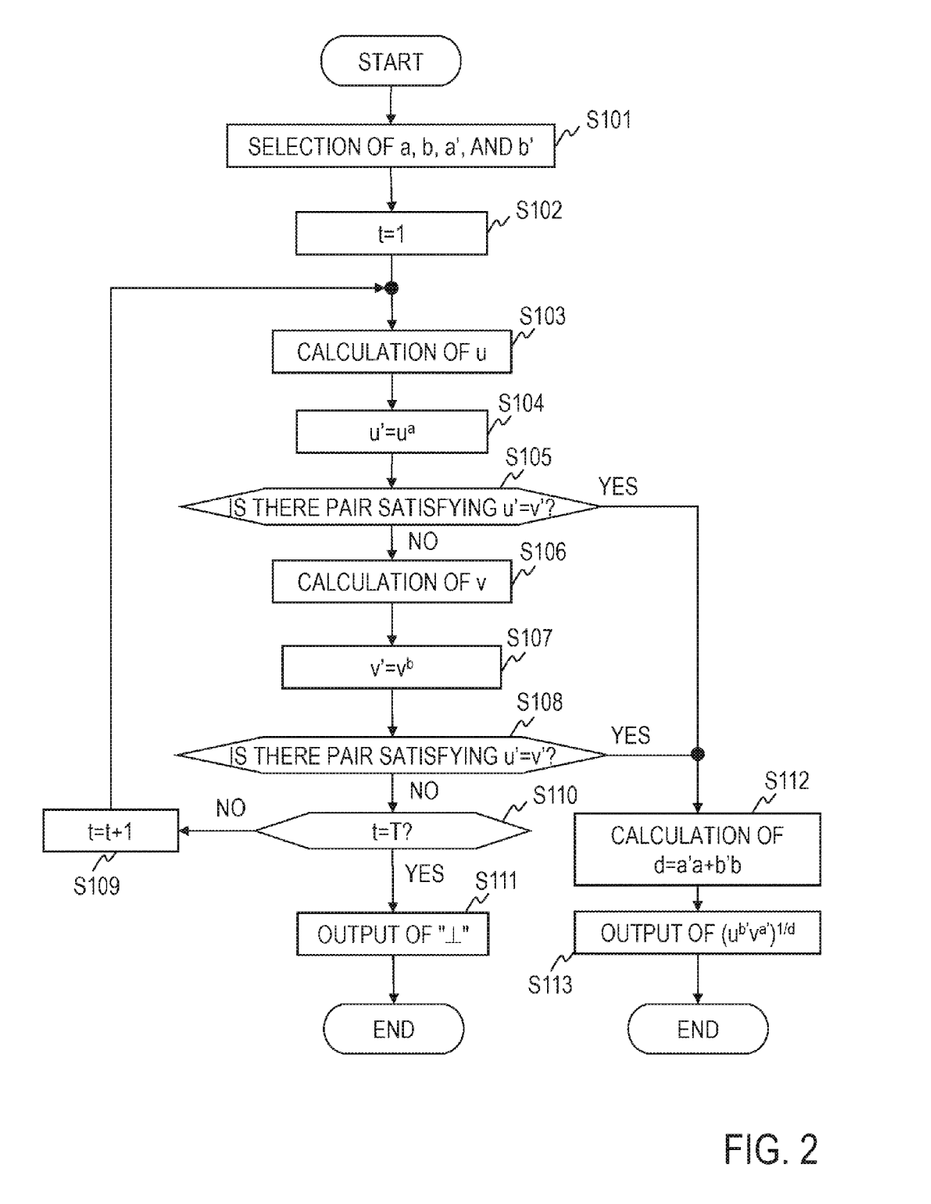
FIG. 2 is a flow diagram illustrating a self-correcting method of the first embodiment.

As illustrated in FIG. 2, the integer selection unit 112 selects integers a, b, a', and b' at random (step S 101). The integers a, b, a', and b' may be selected from any range. a and b may be coprime and do not have to be coprime. For example, a and b are positive integers. However, at least one of a and b may be 0 or a negative integer. Information about the integers a and b is transmitted to the first power calculation unit 113, the second power calculation unit 116, the first randomizable sampler 121, and the second randomizable sampler 122. Information about the integers a, b, a', and b' is transmitted to the final calculation unit 119.

The control unit 118 sets t=1 (step S102).

The first randomizable sampler 121 is capable of calculating $f(x)^b x_1$. The first randomizable sampler 121 performs calculation by using x and b and sets the calculation result to u (step S103). A specific example of the calculation result u will be described later. The calculation result u is transmitted to the first power calculation unit 113. In this application, the expression "capable of calculating" represents that calculation can be correctly performed with a probability which is equal to or larger than a non-negligible probability. The non-negligible probability represents a probability which is equal to or larger than 1/F(k) when a polynomial which is a broadly monotonic function for a security parameter k (here, k is a positive natural number) is set to a polynomial F(k). An example of the broadly monotonic function is a monotonically non-decreasing function (non-decreasing function). Here, to calculate $f(x)^b x_1$ represents to obtain a value of a formula which is defined as $f(x)^b x_1$. As long as a value of the formula $f(x)^b x_1$ can be finally obtained, a calculation method does not matter. The same goes for calculation of other formulas which will appear in this application. Further, in this application, calculation which is defined by a group is expressed in a multiplicative manner.

The first power calculation unit 113 calculates $u'=u^{a'}$ (step S104). A pair (u,u') of the calculation result u and u' which is obtained by calculation based on the calculation result u is stored in the first list storage unit 114.

The determination unit 115 determines whether or not there is a pair which satisfies u'=v' among pairs (u,u') which are stored in the first list storage unit 114 and pairs (v,v') which are stored in the second list storage unit 117 (step S105). If pairs (v,v') are not stored in the second list storage unit 117, processing of following step S106 is performed without performing the processing of step S105. When there is a pair which satisfies u'=v', the process goes to step S112. When there is not a pair which satisfies u'=v', the process goes to step S106.

The second randomizable sampler 122 is capable of calculating $f(x)^a x_2$. The second randomizable sampler 122 performs calculation by using x and a and sets the calculation result to v (step S106). A specific example of the calculation result v will be described later. The calculation result v is transmitted to the second power calculation unit 116. The second power calculation unit 116 calculates $v'=v^{b'}$ (step S107). A pair (v,v') of the calculation result v and v' which is obtained by calculation based on the calculation result v is stored in the second list storage unit 117.

The determination unit 115 determines whether or not there is a pair which satisfies u'=v' among pairs (u,u') which are stored in the first list storage unit 114 and pairs (v,v') which are stored in the second list storage unit 117 (step S108). When there is a pair which satisfies u'=v', the process goes to step S112. When there is not a pair which satisfies u'=v', the process goes to step S110.

The control unit 118 determines whether or not t=T is satisfied (step S110). T denotes a predetermined positive natural number. When t=T is satisfied, the control unit 118 outputs information representing that calculation is impossible, for example, outputs a symbol "⊥" (step S111) and the processing is ended. The information representing that calculation is impossible (the symbol "⊥" in this example) represents that reliability of performance of correct calculation is below a reference which is defined by T. In other words, the information represents that calculation has not been able to be correctly performed in T-time repetitions. When t=T is not satisfied, the control unit 118 increments t by 1, that is, sets as t=t+1 (step S109) and the process returns to step S103.

When it is determined that u'=v' is satisfied, the final calculation unit 119 calculates d=a'a+b'b (step S112) and calculates $(u^{b'}v^{a'})^{1/d}$ by using u and v which correspond to u' and v', and a', b', and d so as to output $(u^{b'}v^{a'})^{1/d}$ (step S113). That is, the final calculation unit 119 obtains d=a'a+b'b and outputs $(u^{b'}v^{a'})^{1/d}$ for d. The outputted $(u^{b'}v^{a'})^{1/d}$ satisfies $(u^{b'}v^{a'})^{1/d}=f(x)$. The reason will be described below.

<<Reason Why $(u^{b'}v^{a'})^{1/d}=f(x)$ is satisfied>>

As disclosed in Patent Literature 1 and Patent Literature 2, if u'=v' holds, that is, if $u^a=v^b$ holds, it is highly probable that the first randomizable sampler has correctly computed $u=f(x)^b$, the second randomizable sampler has correctly computed $v=f(x)^a$, and $x_1$ and $x_2$ are identity elements $e_g$ of the group G. When the first randomizable sampler 121 correctly calculates $u=f(x)^b x_1$, further, the second randomizable sampler 122 correctly calculates $v=f(x)^a x_2$, and $x_1$ and $x_2$ are identity elements $e_g$ of the group G, $u^{b'}v^{a'}=(f(x)^b x_1)^{b'}(f(x)^a x_2)^{a'}=(f(x)^b e_g)^{b'}(f(x)^a e_g)^{a'}=f(x)^{bb'}e_g^{b'}f(x)^{aa'}e_g^{a'}=f(x)^{(a'a+b'b)}$ is satisfied. Here, $u^{b'}v^{a'}=f(x)^d$ is satisfied when d=a'a+b'b. Therefore, $(u^{b'}v^{a'})^{1/d}=f(x)$ is satisfied.

<<Specific Examples of u and v>>

Examples of u and v include u and v which are disclosed in Patent Literature 1 and Patent Literature 2. For example, $u=z_1 v^{-r1}$ and $v=z_2 v^{-r2}$ are held. Here, the group H is a cyclic group, a generator of the cyclic group H is $\mu_h$, r1 and r2 are random natural numbers which are 0 or larger, $v=f(\mu_h)$ is satisfied, $\tau_1=\mu_h^{r1}x^b$ is satisfied, $\tau_2=\mu_h^{r2}x^a$ is satisfied, further, $z_1=f(\tau_1)$ is satisfied with a probability larger than a certain probability, and $z_2=f(\tau_2)$ is satisfied with a probability larger than a certain probability. That is, $z_1=f(\tau_1)$ may be satisfied or $z_1 \neq f(\tau_1)$ may be satisfied. Further, $z_2=f(\tau_2)$ may be satisfied or $z_2 \neq f(\tau_2)$ may be satisfied. Namely, $z_1$ and $z_2$ are respectively calculation results $f(\tau_1)$ and $f(\tau_2)$ which include an intended or unintended error. "A certain probability" is a probability which is smaller than 100% and equal to or larger than 0%. An example of "a certain probability" is a non-negligible probability.

Alternatively, $u=z_1 Y^{-r4}\mu_g^{-r5}$ and $v=z_2 Y^{-r6}\mu_g^{-r7}$ may be satisfied. Here, the group H is a direct product group G×G of the group G, the group G is a cyclic group, a generator of the cyclic group G is $\mu_g$, $x=(c_1,c_2)$, (V,W) is an element of the group H, f(V,W)=Y, r4 to r7 are random numbers of natural numbers which are 0 or larger, $\tau_1=(c_2^b W^{-r4}, c_1^b V^{r4}\mu_g^{r5})$ is satisfied, $\tau_2=(c_2^a W^{r6}, c_1^a V^{r6}\mu_g^{r7})$ is satisfied, $z_1=f(\tau_1)$ is satisfied with a probability larger than a certain probability, and $z_2=f(\tau_2)$ is satisfied with a probability larger than a certain probability.

[Modification of First Embodiment]

One of the integers a and b may be a constant such as 1 and at least one of the integers a' and b' may be a constant. A part of the integers a, b, a', and b' may be a constant and a part of processing units and steps may be omitted. For example, when b is a constant which is 1, selection of the integer b in step S101 is unnecessary and v'=v is obtained. Therefore, the second power calculation unit 116 and step S107 are unnecessary. Alternatively, d may be set to a constant or a random number which is other than 1, the integers a, b, a', and b' which satisfy d=a'a+b'b may be selected in step S101, and whereby the processing of step S112 may be omitted. Alternatively, the integer selection unit 112 may perform selection of the integers a, b, a', and b' and calculation of d=a'a+b'b in step S101. Alternatively, the integer selection unit 112 may calculate d=a'a+b'b at any time after step S102 and before step S113. In these cases, the processing of step S112 is omitted and the final calculation unit 119 obtains d from the integer selection unit 112. Further, the final calculation unit 119 may output $(u^{b'}v^{a'})^{1/d}$ in a case of d≠0. In a case of d=0, error termination may be performed. Alternatively, in a case of d=0, at least a part of the integers a, b, a', and b' may be reselected in step S101 and the processing may be done again. Further, a' and b' may be selected at any time as long as the selection is performed before a' and b' become necessary for calculation.

[Second Embodiment]

A second embodiment shows the configuration in which the first embodiment is applied to a cloud type key management system. Differences with the first embodiment will be chiefly described below and description of points common to the first embodiment will be omitted.

<Configuration>

Figure 3:
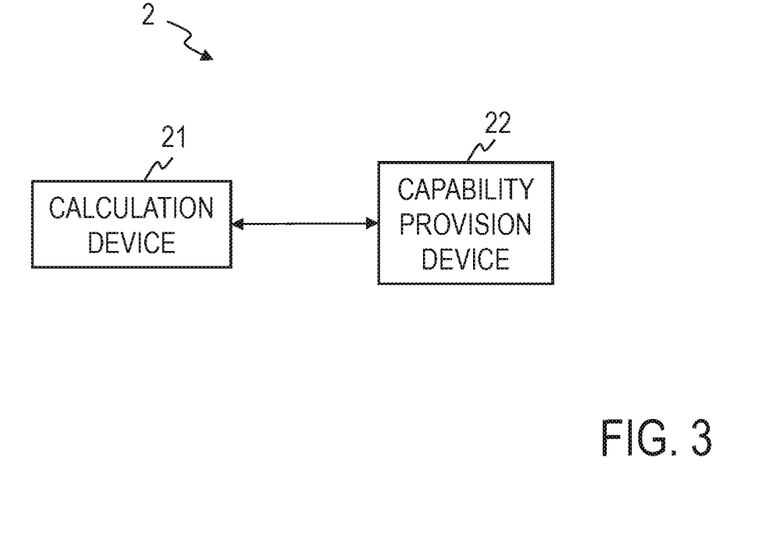
FIG. 3 is a block diagram illustrating the configuration of a calculation system which executes a self-correcting technique of a second embodiment.

As illustrated in FIG. 3, a proxy calculation system 2 according to the second embodiment includes a calculation device 21 which does not hold a decryption key and a capability provision device 22 which holds the decryption key, for example. The calculation device 21 requests the capability provision device 22 to provide capability of decryption of a cipher text and decrypts the cipher text by using the decryption capability which is provided from the capability provision device 22. The calculation device 21 and the capability provision device 22 are configured to be able to exchange information. For example, the calculation device 21 and the capability provision device 22 are enabled to exchange information via a transmission line, a network, a portable recording medium, or the like.

Figure 4:
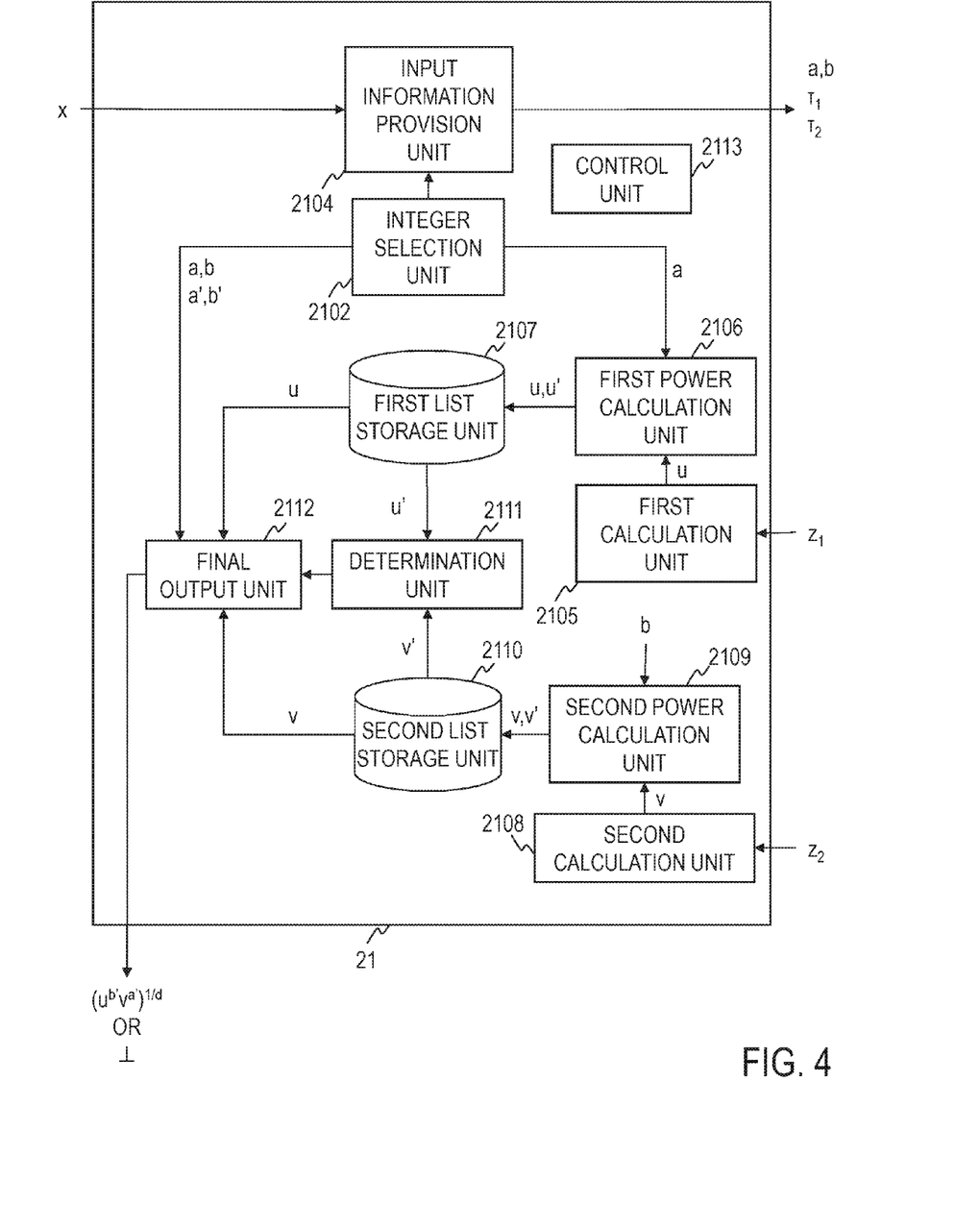
FIG. 4 is a block diagram illustrating the configuration of a calculation device of FIG. 3.

As illustrated in FIG. 4, the calculation device 21 according to the second embodiment includes an integer selection unit 2102, an input information provision unit 2104, a first calculation unit 2105, a first power calculation unit 2106, a first list storage unit 2107, a second calculation unit 2108, a second power calculation unit 2109, a second list storage unit 2110, a determination unit 2111, a final output unit 2112, and a control unit 2113. Examples of the calculation device 21 include equipment, which is provided with a calculating function and a storing function, such as a card reader/writer device and a mobile telephone, a computer, on which a special program is loaded, such as the above-described computer, and the like. Further, a part or all processing units may be constituted by using an electronic circuit which independently realizes the processing function instead of an electronic circuit, which realizes the functional configuration when a program is read in, such as a CPU.

Figure 5:
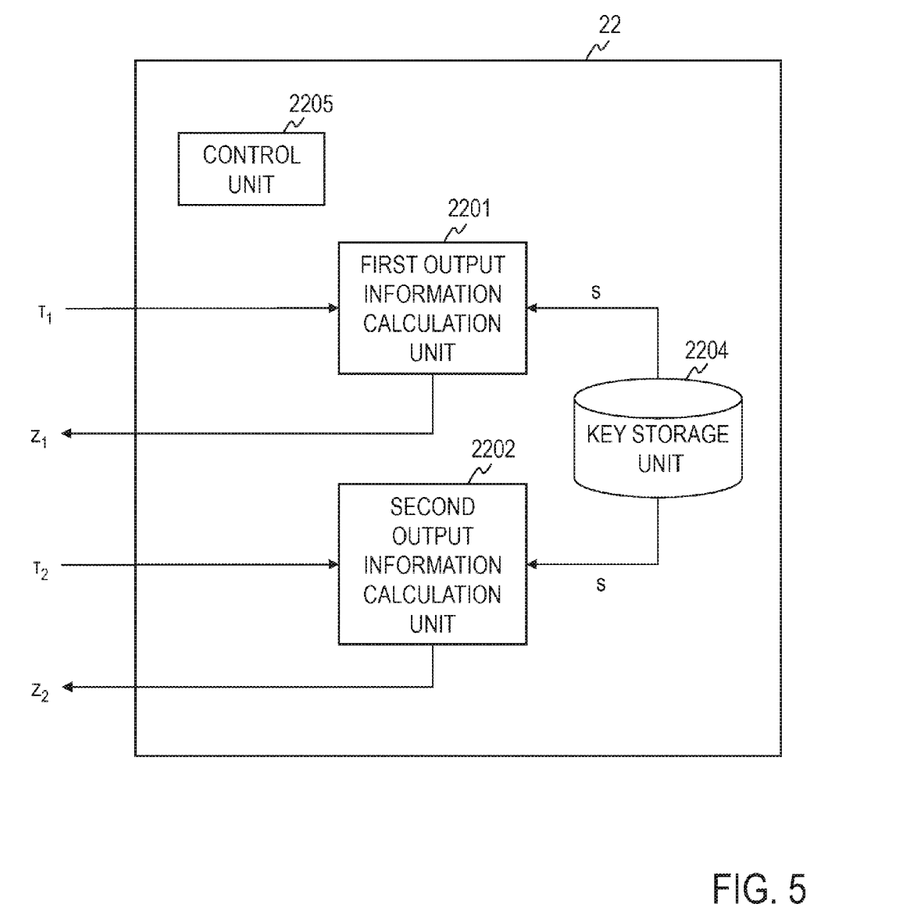
FIG. 5 is a block diagram illustrating the configuration of a capability provision device of FIG. 3.

As illustrated in FIG. 5, the capability provision device 22 of the second embodiment includes a first output information calculation unit 2201, a second output information calculation unit 2202, a key storage unit 2204, and a control unit 2205, for example. Examples of the capability provision device 22 include a tamper resistant module such as an IC card and an IC chip, equipment, which is provided with a calculating function and a storing function, such as a mobile telephone, a computer, on which a special program is loaded, such as the above-described computer, and the like.

<Processing>

Processing of the present embodiment is now described. As premises for the processing, G and H are groups (for example, finite commutative groups such as a cyclic group), f(x) is a decryption function by which a cipher text x which is an element of the group H is decrypted by a specific decryption key s so as to obtain an element of the group G, generators of the groups G and H are $\mu_g$ and $\mu_h$ respectively, $X_1$ and $X_2$ are random variables values of which are in the group G, a realization of the random variable $X_1$ is $x_1$, and a realization of the random variable $X_2$ is $x_2$. Each processing of the calculation device 21 is executed in the control of the control unit 2113 and each processing of the capability provision device 22 is executed in the control of the control unit 2205.

Figure 6:
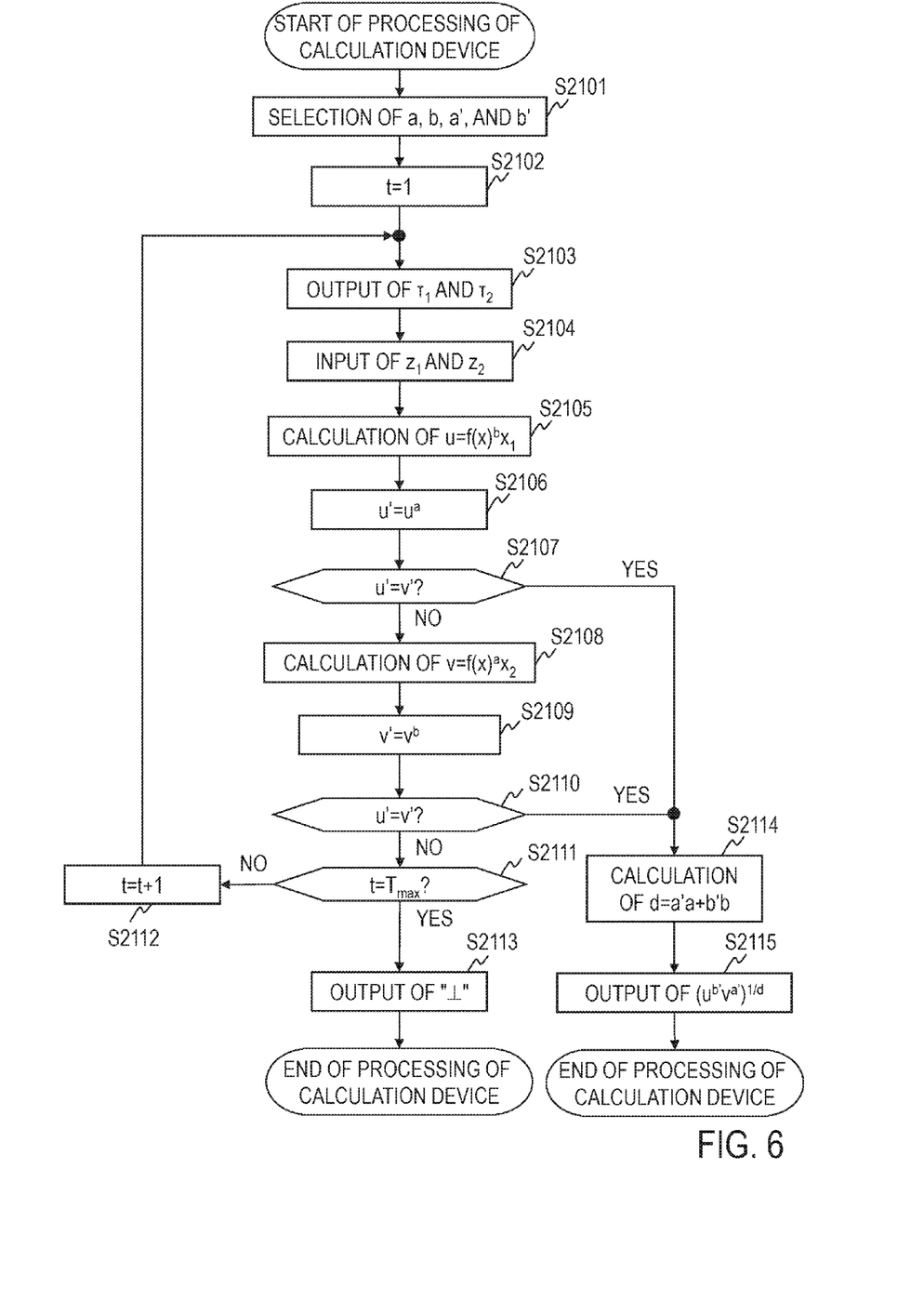
FIG. 6 is a flow diagram illustrating processing of the calculation device of the second embodiment.

As illustrated in FIG. 6, the integer selection unit 2102 of the calculation device 21 (FIG. 4) selects integers a, b, a', and b' at random (step S2101). At least a part of information of the integers a and b is transmitted to the input information provision unit 2104, the first power calculation unit 2106, and the second power calculation unit 2109. Information of the integers a, b, a', and b' is transmitted to the final output unit 2112.

The control unit 2113 sets t=1 (step S2102).

The input information provision unit 2104 generates and outputs first input information $\tau_1$ and second input information $\tau_2$ which respectively correspond to the inputted cipher text x and are elements of the group H (step S2103). Preferably, each of the first input information $\tau_1$ and the second input information $\tau_2$ is information obtained by perturbing a relation with the cipher text x. For example, the first input information $\tau_1$ and the second input information $\tau_2$ respectively correspond to the cipher text x, but it is hard to obtain the cipher text x only from the first input information $\tau_1$ and the second input information $\tau_2$. The expression "hard to obtain the cipher text x" represents that it is impossible to obtain the cipher text x within polynomial time, for example. Accordingly, the calculation device 21 can conceal the cipher text x from the capability provision device 22. Preferably, the first input information $\tau_1$ of the present embodiment further corresponds to the integer b which is selected by the integer selection unit 2102 and the second input information $\tau_2$ further corresponds to the integer a which is selected by the integer selection unit 2102. Accordingly, the calculation device 21 is enabled to evaluate the decryption capability provided from the capability provision device 22 with high precision. Specific examples of $\tau_1$ and $\tau_2$ are same as those illustrated in the first embodiment.

Figure 7:
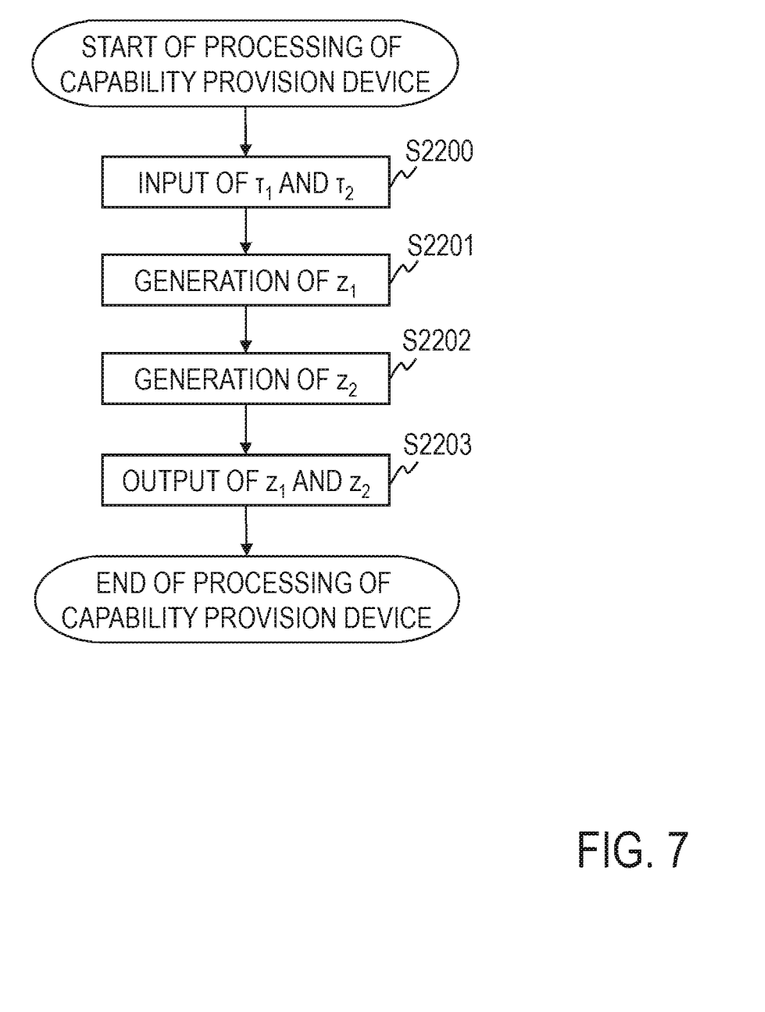
FIG. 7 is a flow diagram illustrating processing of the capability provision device of the second embodiment.

As illustrated in FIG. 7, the first input information $\tau_1$ is inputted is into the first output information calculation unit 2201 of the capability provision device 22 (FIG. 5) and the second input information $\tau_2$ is inputted into the second output information calculation unit 2202 (step S2200).

The first output information calculation unit 2201 correctly calculates $f(\tau_1)$ with a probability larger than a certain probability by using the first input information $\tau_1$ and the decryption key s stored in the key storage unit 2204 and sets the obtained calculation result to first output information $z_1$ (step S2201). The second output information calculation unit 2202 correctly calculates $f(\tau_2)$ with a probability larger than a certain probability by using the second input information $\tau_2$ and the decryption key s stored in the key storage unit 2204 and sets the obtained calculation result to second output information $z_2$ (step S2202). Namely, the first output information calculation unit 2201 and the second output information calculation unit 2202 output calculation results which include an intended or unintended error. In other words, the result of the computation by the first output information calculation unit 2201 may or may not be $f(\tau_1)$, and the result of the computation by the second output information calculation unit 2202 may or may not be $f(\tau_2)$.

The first output information calculation unit 2201 outputs the first output information $z_1$ and the second output information calculation unit 2202 outputs the second output information $z_2$ (step S2203).

Referring back to FIG. 6, the first output information $z_1$ is inputted into the first calculation unit 2105 of the calculation device 21 (FIG. 4) and the second output information $z_2$ is inputted into the second calculation unit 2108. The first output information $z_1$ and the second output information $z_2$ correspond to decryption capability which is provided from the capability provision device 22 to the calculation device 21 (step S2104).

The first calculation unit 2105 generates a calculation result $u=f(x)^b x_1$ from the first output information $z_1$. $z_1=f(\tau_1)$ may or may not be satisfied. The first calculation unit 2105 is capable of generating the calculation result $u=f(x)^b x_1$. A specific example of a method for generating u from $z_1$ is described in the first embodiment. For example, $u=z_1 v^{-r1}$ is satisfied for $\tau_1=\mu_h^{r1} x^b$, $u=z_1 Y^{-r4} \mu_g^{-r5}$ is satisfied for $\tau_1=(c_2^b W^{r4}, c_1^b V^{r4} \mu_g^{r5})$. The calculation result u is transmitted to the first power calculation unit 2106 (step S2105).

The first power calculation unit 2106 calculates $u'=u^a$. A pair $(u,u')$ of the calculation result u and u' which is obtained by calculation based on the calculation result u is stored in the first list storage unit 2107 (step S2106).

The determination unit 2111 determines whether or not there is a pair which satisfies $u'=v'$ among pairs $(u,u')$ which are stored in the first list storage unit 2107 and pairs $(v,v')$ which are stored in the second list storage unit 2110 (step S2107). If pairs $(v,v')$ are not stored in the second list storage unit 2110, processing of following step S2108 is performed without performing the processing of step S2107. When there is a pair which satisfies $u'=v'$, the process goes to step S2114. When there is not a pair which satisfies the process goes to step S2108.

In step S2108, the second calculation unit 2108 generates a calculation result $v=f(x)^a x_2$ from the second output information $z_2$. $z_2=f(\tau_2)$ may or may not be satisfied. The second calculation unit 2108 is capable of generating the calculation result $v=f(x)^a x_2$. A specific example of a method for generating v from $z_2$ is described in the first embodiment. For example, $v=z_2 v^{-r2}$ is satisfied for $\tau_2=\mu_h^{r2} x^a$, and $v=z_2 Y^{-r6} \mu_g^{-r7}$ is satisfied for $\tau_2=(c_2^a W^{r6}, c_1^a V^{r6} \mu_g^{r7})$. The calculation result v is transmitted to the second power calculation unit 2109 (step S2108).

The second power calculation unit 2109 calculates $v'=v^b$. A pair $(v,v')$ of the calculation result v and v' which is obtained by calculation based on the calculation result v is stored in the second list storage unit 2110 (step S2109).

The determination unit 2111 determines whether or not there is a pair which satisfies $u'=v'$ among pairs $(u,u')$ which are stored in the first list storage unit 2107 and pairs $(v,v')$ which are stored in the second list storage unit 2110 (step S2110). When there is a pair which satisfies $u'=v'$, the process goes to step S2114. When there is not a pair which satisfies $u'=v'$, the process goes to step S2111.

In step S2111, the control unit 2113 determines $t=T_{max}$ is satisfied (step S2111). $T_{max}$ is a predetermined natural number. When $t=T_{max}$ is satisfied, the control unit 2113 outputs information representing that the calculation is impossible, for example, outputs a symbol "⊥" (step S2113) and the processing is ended. When $t=T_{max}$ is not satisfied, the control unit 2113 increments t by 1, that is, sets as $t=t+1$ (step S2112) and the process returns to step S2103.

In step S2114, the final output unit 2112 calculates $d=a'a+b'b$ (step S2114) and calculates $(u^{b'} v^{a'})^{1/d}$ by using u and v which correspond to u' and v', and a', b', and d so as to output $(u^{b'} v^{a'})^{1/d}$ (step S2115). That is, the final output unit 2112 obtains $d=a'a+b'b$ and outputs $(u^{b'} v^{a'})^{1/d}$ for d. The outputted $(u^{b'} v^{a'})^{1/d}$ is a decryption result $f(x)$ of the cipher text x with high probability. Further, the above-described processing may be repeated several times and the most common value among values obtained in step S2115 may be set to a decryption result.

[Modification of Second Embodiment]

One of the integers a and b may be a constant such as 1 and at least one of the integers a' and b' may be a constant. A part of the integers a, b, a', and b' may be a constant and a part of processing units and steps may be omitted. For example, when b is a constant which is 1, selection of the integer b in step S2101 is unnecessary and $v'=v$ is obtained. Therefore, the second power calculation unit 2109 and step S2109 are unnecessary. Alternatively, d may be set to a constant or a random number which is other than 1, the integers a, b, a', and b' which satisfy $d=a'a+b'b$ may be selected in step S2101, and whereby the processing of step S2114 may be omitted. Alternatively, the integer selection unit 2102 may perform selection of the integers a, b, a', and b' and calculation of $d=a'a+b'b$ in step S2101. Alternatively, the integer selection unit 2102 may calculate $d=a'a+b'b$ at any time after step S2102 and before step S2115. In these cases, the processing of step S2114 is omitted and the final output unit 2112 obtains d from the integer selection unit 2102. Further, the final output unit 2112 may output $(u^{b'} v^{a'})^{1/d}$ when $d \neq 0$ is satisfied. The processing may terminate with error when $d=0$ is satisfied. Alternatively, when $d=0$ is satisfied, at least a part of the integers a, b, a', and b' may be reselected in step S2101 and the processing may be performed again. Further, a' and b' may be selected at any time as long as the selection is performed before a' and b' become necessary for calculation.

[Other Modifications]

The present invention is not limited to the above-described embodiments. For example, the self-correcting technique in each embodiment of Patent Literature 2, Japanese Patent Application Laid Open No. 2012-237881, Japanese Patent Application Laid Open No. 2012-220834, Japanese Patent Application Laid Open No. 2012-220814, Japanese Patent Application Laid Open No. 2012-151756, and the like may be used for the self-correcting technique of the present invention.

For example, the calculation system may further include a decryption control device in the second embodiment. This decryption control device may output a decryption control command for controlling decryption processing of the calculation device to the capability provision device and the capability provision device may control whether or not both of the first output information $z_1$ and the second output information $z_2$ are outputted, in accordance with the decryption control command. Further, the calculation system may include a plurality of pieces of capability provision devices and output a decryption control command to any of the capability provision devices and each of the capability provision devices may control whether or not both of the first output information $z_1$ and the second output information $z_2$ are outputted, in accordance with the decryption control command.

In the second embodiment, the calculation system may further include a decryption control device, $G_\iota$ and $H_\iota$ may be groups, $\omega$ may be an integer which is 2 or larger, $\iota=1, \ldots, \omega$, $f_\iota(\lambda_\iota)$ may be a decryption function by which a cipher text $\lambda_\iota$ which is an element of the group $H_\iota$ is decrypted by a specific decryption key $s_\iota$ so as to obtain an element of the group $G_\iota$, $X_{\iota,1}$ and $X_{\iota,2}$ may be random variables values of which are in the group $G_\iota$, $x_{\iota,1}$ may be a realization of the random variable $X_{\iota,1}$, $x_{\iota,2}$ may be a realization of the random variable $X_{\iota,2}$, $a(\iota)$, $b(\iota)$, $a'(\iota)$, and $b'(\iota)$ may be integers, the group G may be a group $G_1$, the group H may be a group $H_1$, the cipher text x may be a cipher text $\lambda_1$, the decryption function $f(x)$ may be a decryption function $f_1(\lambda_1)$, the random variable $X_1$ may be a random variable $X_{1,1}$, the random variable $X_2$ may be a random variable $X_{1,2}$, the realization $x_1$ may be a realization $x_{1,1}$, the realization $x_2$ may be a realization $x_{1,2}$, the integer a may be an integer $a(1)$, the integer b may be an integer $b(1)$, the integer a' may be an integer $a'(1)$, and the integer b' may be an integer $b'(1)$. In this case, the calculation device outputs first input information $\tau_{\iota,1}$ and second input information $\tau_{\iota,2}$ which correspond to the cipher text $\lambda_\iota$ and are elements of the group $H_\iota$, and the capability provision device correctly calculates $f_\iota(\tau_{\iota,1})$ with a probability larger than a certain probability by using the first input information $\tau_{\iota,1}$ so as to output the obtained arithmetic result as first output information $z_{\iota,1}$ and the capability provision device correctly calculates $f_\iota(\tau_{\iota,2})$ with a probability larger than a certain probability by using the second input information $\tau_{\iota,2}$ so as to output the obtained arithmetic result as second output information $z_{\iota,2}$. The calculation device generates an arithmetic result $u_\iota = f_\iota(\lambda_\iota)^{b(\iota)} x_{\iota,1}$ based on the first output information $z_{\iota,1}$ and generates an arithmetic result $v_\iota = f_\iota(\lambda_\iota)^{a(\iota)} x_{\iota,2}$ based on the second output information $z_{\iota,2}$. When the arithmetic results $u_\iota$ and $v_\iota$ satisfy $u_\iota^{a(\iota)} = v_\iota^{b(\iota)}$, the calculation device obtains $a'(\iota)a(\iota)+b'(\iota)b(\iota)=d(\iota)$, for example, so as to output $(u_\iota^{b'(\iota)} v_\iota^{a'(\iota)})^{1/d(\iota)}$ for $d(\iota)$. The decryption control device Outputs a decryption control command for controlling decryption processing of the calculation device to the capability provision device and the capability provision device control whether or not both of the first output information $z_{\iota,1}$ and the second output information $z_{\iota,2}$ are outputted from the first output information calculation unit and the second output information calculation unit, in accordance with the decryption control command.

Further, in this case, the decryption control command may correspond to any decryption function $f_\iota$ and the capability provision device may control presence/absence of outputs of both of the first output information $z_{\iota,1}$ and the second output information $z_{\iota,2}$ which correspond to the decryption function $f_\iota$ corresponding to the decryption control command. Furthermore, the calculation device may generate a restored value which is restorable only when all decryption values which are obtained by decrypting the cipher texts $\lambda_\iota$ for respective $\iota=1, \ldots, \omega$ with the decryption key $s_\iota$ are obtained, by using $(u_\iota^{b'(\iota)} v_\iota^{a'(\iota)})^{1/d(\iota)}$ for respective $\iota=1, \ldots, \omega$ which are outputted from the final output unit.

Further, in the second embodiment, the calculation system may include a plurality of pieces of calculation devices and the calculation devices may obtain a decryption result by using one piece of capability provision device.

In the second embodiment, $f(x)$ is a decryption function by which the cipher text x which is an element of the group H is decrypted by the specific decryption key s to obtain an element of the group G. However, other functions for obtaining an element of the group G based on an input of an element x of the group H may be set as $f(x)$ in the second embodiment. For example, $f(x)$ may be an encryption function.

Further, instead of exchanging information via a network by respective devices, at least part of pairs of the devices may exchange information via a portable recording medium. Alternatively, at least part of pairs of devices may exchange information via a non-portable recording medium. That is, a combination composed of part of these devices may be a single device. Alternatively, the calculation device may be composed of a plurality of devices and the capability provision device may be composed of a plurality of devices.

The above-described various types of processing may be executed not only in a time-series manner in accordance with the description but also in a parallel manner or an independent manner, depending on processing capability of a device which executes the processing or as necessary. Further, it is indisputable that alterations can be arbitrarily made without departing from the intent of the present invention.

In a case where the above-described configuration is realized by a computer, processing contents of functions which should be obtained by respective devices are described by a program. By executing this program by a computer, the above-described processing functions are realized on the computer. The program in which the processing contents are described can be recorded in a recording medium which is readable by a computer. An example of the recording medium which is readable by a computer is a is non-transitory recording medium. Examples of such recording medium include a magnetic recording device, an optical disk, a magnetooptical recording medium, a semiconductor memory, and the like.

This program is distributed by selling, transferring, or lending a portable recording medium such as a DVD and a CD-ROM in which the program is recorded, for example. Further, this program may be distributed such that this program is stored in a storage device of a server computer and is transferred from the server computer to other computers through the network.

A computer which executes such program once stores the program which is recorded in a portable recording medium or the program transferred from the server computer a storage device thereof, for example. In execution of processing, the computer reads the program which is stored in the storage device thereof and executes processing in accordance with the program which is read. As another executing configuration of this program, a computer may directly read the program from a portable recording medium so as to execute processing in accordance with the program, and further, the computer may sequentially execute processing in accordance with a received program whenever a program is transferred from the server computer to this computer. The above-described processing may be executed by a service of an application service provider (ASP) type in which a processing function is realized only by an executing instruction of processing and result acquisition, without transferring the program to the computer from the server computer.

The processing functions of the present device are realized by executing a predetermined program on a computer in the above-described embodiment, but at least a part of these processing functions may be realized on hardware.

DESCRIPTION OF REFERENCE NUMERALS

1, 21: calculation device
2: proxy calculation system

What is claimed is:

1. A calculation device comprising:
processing circuitry configured to
select integers a, b, a', and b' at random;
calculate $f(x)^b x_1$ and set a calculation result of $f(x)^b x_1$ to u;
calculate $f(x)^a x_2$ and set a calculation result of $f(x)^a x_2$ to v;
calculate d=a'a+b'b with the integers a, b, a' and b' when the calculation result u and the calculation result v satisfy $u^a = v^b$;
calculate $(u^{b'} v^{a'})^{1/d}$ for the calculated d when d≠0 is satisfied; and
output $(u^{b'} v^{a'})^{1/d}$ for d=a'a+b'b when $(u^{b'} v^{a'})^{1/d}$ is calculated; wherein G and H are groups, f is a function for mapping an element x of the group H to the group G, $X_1$ and $X_2$ are random variables values of which are in the group G, a realization of the random variable $X_1$ is $x_1$, a realization of the random variable $X_2$ is $x_2$, and when the processing circuitry determines that the calculation result u and the calculation result v fail to satisfy $u^a = v^b$ after a predetermined number of iterations, the processing circuitry terminates the calculations and outputs a determination result that indicates that the calculation device cannot perform the calculations within a predetermined standard of reliability.

2. The calculation device according to claim 1, wherein d≠1 is satisfied.

3. A non-transitory computer-readable recording medium in which a program for making a computer function as the calculation device according to claim 1 or 2 is recorded.

4. A calculation method, implemented by a calculation device, comprising:
selecting integers a, b, a', and b' at random;
setting a calculation result of $f(x)^b x_1$ to u in which $f(x)^b x_1$ is calculable;
setting a calculation result of $f(x)^a x_2$ to v in which $f(x)^a x_2$ is calculable;
calculating d=a'a+b'b with the integers a, b, a' and b' when the calculation result u and the calculation result v satisfy $u^a = v^b$;
calculating $(u^{b'} v^{a'})^{1/d}$ for the calculated d when d≠0 is satisfied; and
outputting $(u^{b'} v^{a'})^{1/d}$ is calculated; wherein G and H are groups, f is a function for mapping an element x of the group H to the group G, $X_1$ and $X_2$ are random variables values of which are in the group G, a realization of the random variable $X_1$ is $x_1$, a realization of the random variable $X_2$ is $x_2$, and when determining that the calculation result u and the calculation result v fail to satisfy $u^a = v^b$ after a predetermined number of iterations, terminating the calculations and outputting a determination result that indicates that the calculation device cannot perform the calculations within a predetermined standard of reliability.

5. The calculation method according to claim 4, wherein d≠1 is satisfied.

* * * * *